(12) United States Patent
Cambridge (10) Patent No.: US 11,366,521 B2
(45) Date of Patent: Jun. 21, 2022

(54) DEVICE FOR INTUITIVE DEXTEROUS TOUCH AND FEEL INTERACTION IN VIRTUAL WORLDS

(71) Applicant: THIKA HOLDINGS LLC, St. Pete Beach, FL (US)

(72) Inventor: Vivien Cambridge, Myrtle Beach, SC (US)

(73) Assignee: THIKA HOLDINGS LLC, St. Pete Beach, FL (US)

(*) Notice: Subject to any disclaimer, the term of this patent is extended or adjusted under 35 U.S.C. 154(b) by 395 days.

(21) Appl. No.: 14/943,421

(22) Filed: Nov. 17, 2015

(65) Prior Publication Data

US 2016/0139669 A1 May 19, 2016

Related U.S. Application Data

(60) Provisional application No. 62/172,061, filed on Jun. 6, 2015, provisional application No. 62/080,759, filed on Nov. 17, 2014.

(51) Int. Cl.
*G06F 3/01* (2006.01)
*G06F 3/0346* (2013.01)

(52) U.S. Cl.
CPC ............ *G06F 3/016* (2013.01); *G06F 3/011* (2013.01); *G06F 3/0346* (2013.01)

(58) Field of Classification Search
CPC ........ G06F 3/016; G06F 3/0346; G06F 3/011; G06F 2203/015
See application file for complete search history.

(56) References Cited

U.S. PATENT DOCUMENTS

| 10,200,680 | B2 | 2/2019 | Cambridge |
| 2002/0021277 | A1 | 2/2002 | Kramer et al. |
| 2005/0128186 | A1 | 6/2005 | Shahoian et al. |
| 2008/0174550 | A1 | 7/2008 | Laurila et al. |
| 2011/0050405 | A1 | 3/2011 | Hollis |
| 2012/0306603 | A1* | 12/2012 | Olsson ................... G05G 9/047 335/229 |
| 2013/0082922 | A1 | 4/2013 | Miller |
| 2015/0097937 | A1 | 4/2015 | Kord |

(Continued)

OTHER PUBLICATIONS

"Control VR—Virtual Reality Gloves for 3D Gaming," Website: <http://controlvr.com>; retrieved from Internet Archive Wayback Machine <https://web.archive.org/web/20140819142744/http://controlvr.com/>; dated Aug. 19, 2014 (7 pages).

(Continued)

*Primary Examiner* — Dennis P Joseph
(74) *Attorney, Agent, or Firm* — Volpe Koenig (57) ABSTRACT

A device for dexterous interaction in a virtual world in disclosed. The device includes a housing including a plurality of buttons and a plurality of vibration elements each associated with at least one of the plurality of buttons. An orientation sensor detects orientation of the housing, and a bearing is configured to allow the housing to freely rotate in a plurality of directions. A processor is in communication with the plurality of buttons, the plurality of vibration elements, and the orientation sensor. A transmitter/receiver unit is configured to receive data from the processor and configured to send and receive data from a central processing unit.

14 Claims, 7 Drawing Sheets

(56) References Cited

U.S. PATENT DOCUMENTS

| 2015/0213653 | A1 | 7/2015 | Kord | |
|---|---|---|---|---|
| 2015/0331488 | A1* | 11/2015 | Grant | G06F 3/011 |
| | | | | 715/702 |
| 2015/0358543 | A1 | 12/2015 | Kord | |
| 2016/0077589 | A1* | 3/2016 | Chataignier | G06F 3/016 |
| | | | | 345/163 |

OTHER PUBLICATIONS

"Control VR—The Future of Virtual Reality, Animation & more by The Control VR Team—Kickstarter," Website: <https://www.kickstarter.com/projects/controlvr/control-vr-motion-capture-for-vr-animation-and-mor>; retrieved from Internet Archive Wayback Machine <https://web.archive.org/web/20140616143459/https://www.kickstarter.com/projects/controlvr/control-vr-motion-capture-for-vr-animation-and-mor>; dated Jun. 16, 2014 (17 pages).

"Oculus VR buys hand-tracking expert Nimble VR," Website: <https://www.cnet.com/tech/gaming/oculus-vr-buys-hand-tracking-expert-nimble-vr/>; dated Dec. 11, 2014 (3 pages).

* cited by examiner

DEVICE FOR INTUITIVE DEXTEROUS TOUCH AND FEEL INTERACTION IN VIRTUAL WORLDS

INCORPORATION BY REFERENCE

The following documents are incorporated herein by reference as if fully set forth herein: U.S. Provisional Application 62/172,061 filed Jun. 6, 2015, and U.S. Provisional Application 62/080,759, filed Nov. 17, 2014.

FIELD OF INVENTION

The present application relates to a controller, and more specifically relates to a feedback controller for the virtual reality environment.

BACKGROUND

Humans use their hands, and most particularly their fingers and palms, to physically manipulate and sense objects in and around their environment without exerting much effort. The two primary functions of hands can be broken down into gross motor skills (such as grasping a large object) and fine motor skills (such as picking up a small pebble). Hands also have a tactile sensing ability, which allows a human to detect the surface features of an object. One of the newest developments in 3-D technology involves the emergence of low cost, high definition stereo headsets. These headsets present the left and right eyes with stereo images and thereby can create the illusion of being inside a computer generated 3-D world. Head-mounted displays for immersive software have been available for some time now, but the newer headsets improve the quality of the 3-D image presented to the user and lower the cost making it available to most users.

It is expected that the emergence of low cost headsets and similar new immersive technologies will sharply increase the number of gamers that will be entering the marketplace for 3-D environment games and applications. However, the technology that allows these users to interact with the 3-D world is lagging behind. The most direct, instinctive and effective way of interacting is through the use of hands. Currently, one type of interactive gaming technology includes data gloves that can be used by gamers to interact with objects. Data gloves are equipped with sensors that detect the movements of the hand and fingers and interface those movements with a 3-D system running on a computer. When data gloves are used in a virtual reality environment, the user sees an image of a corresponding hand and the user can manipulate objects in the virtual environment using the glove. Unfortunately, these existing data gloves are expensive, cumbersome, and often provide an inaccurate replication of a user's hand movements. The existing data gloves require that the user physically wears a glove, sometimes for extended periods of time, which can cause discomfort for the user while the user raises their hands and arms to gesture and to manipulate objects. Current data gloves also include complex sensor systems to collect data related to the positions of the fingers and the location and orientation of the hand, which further increases the costs of these devices.

Various systems have been proposed that include cameras to capture image data that includes the hands of the users. This image data is converted into parametric data for use in software such as games or 3-D virtual world visualization systems. Systems of the current art however require that the hand is always in the field of view of cameras and that cameras are either stationary and in a location independent from the user's body or worn on the user's head so that the field of view of the cameras does not necessarily include the user's hand.

Neither the data gloves nor the vision-based technologies of the present art allow systems to give force feedback to the user's hand. For example, if the user uses a data glove to reach out and touch a tree in virtual space the data glove system will not physically stop the hand when it contacts the tree. If users move their virtual hands up and down against the tree the current data glove systems do not provide a physical feedback to the user's hand that conveys the texture or roughness of the tree's bark.

SUMMARY

The present invention is directed, generally, to an inexpensive system that allows a user to comfortably and intuitively control articulation, location, and orientation of a virtual hand in a virtual world and provides physical force feedback to the user's hand related to interactions between the virtual hand and virtual objects in the virtual world. The system of the present application comprises a handheld housing which fits in the palm of a user's hand and comprises a plurality of pressure-sensitive buttons which are positioned to rest under the user's respective fingers as the user grips the handheld housing.

As the user presses a specific finger or fingers onto associated buttons, then that particular finger or fingers associated with the corresponding virtual hand in a virtual environment is manipulated to reflect the user's movements. For example, if the user presses a specific finger on a respective physical button, then the virtual hand's associated finger will also grip and/or bend. As the user releases the button, then the finger of the associated virtual hand in virtual space opens and/or unbends. The button may be equipped with a sensor configured to detect the degree (e.g., depth or strength of pressing) with which the button is pressed, and the associated virtual finger will bend to reflect the finger's movement against the button as detected by the sensor.

In one embodiment, the handheld housing of the device of the present invention furthermore includes a gyroscope for detecting multiple degrees of motion, with as full a range of motion as possible, and for detecting orientation with respect to the housing of the handheld device. The housing of the handheld device is attached to the grip on a 3-D computer mouse and force feedback controller which controller is fixed in space. A bearing attaches the housing to the 3-D computer mouse and force feedback controller allows the housing to freely move in three dimensions and through a range of motion. Therefore, the user can change the orientation of the virtual hand in the virtual space by intuitively changing the orientation of the orientation of the housing of the handheld device. Since the housing of the handheld device is physically attached, through the bearing, to the grip on a 3-D computer mouse and force feedback controller, the user can move the handset in three dimensions and through a range of motion to change the associated location of a virtual hand in a virtual space. The buttons of the housing of the handheld device include an actuator and vibrator for imparting onto the fingers of the user tactile feedback related to data generated by the 3-D visualization software of the virtual world.

The buttons and the gyroscope are connected to a processor in the housing of the handheld device. The processor creates, collects, processes, and/or transmits data related to the articulation of the virtual hand to a processor for use in software that uses such data. That software can be a 3-D visualization system, such as a 3-D world viewed through a 3-D headset. The software could be implemented in known 3-D headsets, such as Oculus Rift and Samsung Gear VR. The software also generates tactile data for actuating and vibrating the buttons in relation with and/or in response to the user's experience in the virtual world. The tactile data is transmitted to the processor for controlling said buttons. Thus, the system translates the movement of a user's hand so that it is reflected in a virtual world, and also translates actions in the virtual world back to a user's hand through feedback.

The present device is configured to be operated by a human hand for controlling the placement, movement, articulation, and gestures for a corresponding virtual hand in a virtual world and provides tactile feedback to the user from the associated virtual world. According to an aspect of the invention, the articulation of a hand may be considered the positioning of palm and the fingers in space through a range of motion. The device is preferably compact, such the device fits in the palm of the hand and when the hand naturally and comfortably grasps the device, the fingers of the hand rest on buttons. An ergonomic design is preferred. The device preferably has at least five primary buttons, one corresponding to each finger. However, one of ordinary skill in the art would recognize from this disclosure that any number of buttons could be provided. For example, one embodiment can include three or four buttons per finger, to accommodate each segment of a user's respective finger and the related movement of the phalanges. The buttons are preferably movement and/or pressure sensitive so that the user can flex individual fingers by slightly pressing and releasing buttons associated with each finger. Depending on the degree of pressure applied, the corresponding motion of the associated finger will vary. The buttons of the device also preferably vibrate and move to provide tactile feedback to the user which is associated with touch experienced by fingers in the virtual world associated with each button. In other words, the device allows the virtual hand to send sensory output to the user's actual hand.

The device of the present invention senses changes in the orientation of the handheld device so that the user can naturally and intuitively control the orientation of the hand in the virtual world. To accommodate any variations in the orientation and manipulation of the device by the user's hand, the device preferably includes an accelerometer or gyroscope for detecting rotation of the device. In addition, the device attaches to a 3-D computer mouse and force feedback controller. A 3-D mouse and feedback controller is a combined device that has a grip which can be held and moved in three dimensions by a user to enter data related to 3-D position into a computer. The 3-D mouse and feedback controller include motors that can impart forces onto the grip so that the user receives force feedback from software running in the computer. Accordingly, the location of the device of the present invention in 3-D space can be detected and transmitted to virtual world software which allows the user to control the location of a virtual hand and allows force feedback to be applied to the user's hand through the device.

The device of the present invention is designed to limit the actual amount of movement of the user's hand and software implementing relative positioning algorithms serves to move the user's virtual hand in the virtual world through its entire range of motion. This promotes ease of use of the system, particularly limiting use of the user's arm and shoulder.

DETAILED DESCRIPTION OF THE PREFERRED EMBODIMENTS

Figure 1A:
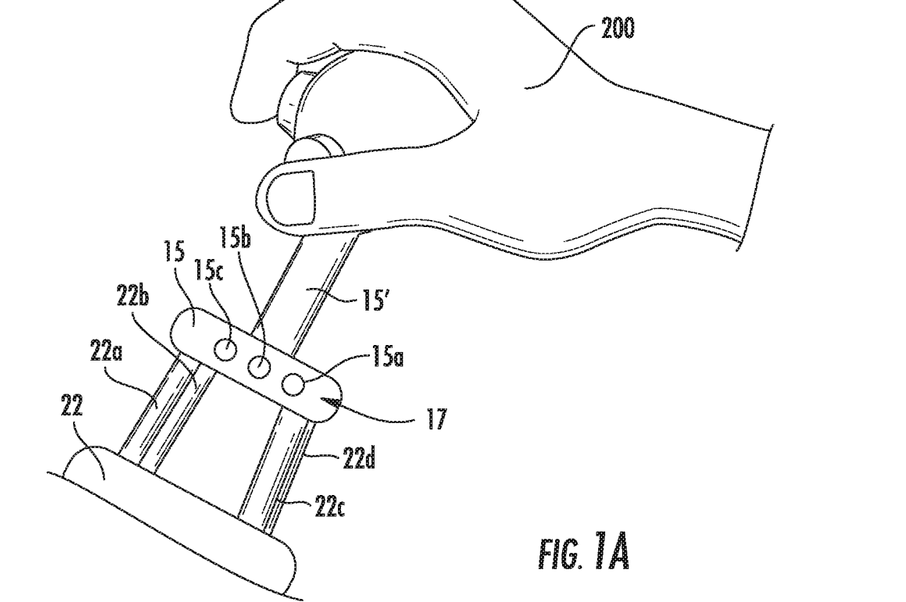
FIG. 1a shows a side view of the device according to one embodiment.
Figure 1B:
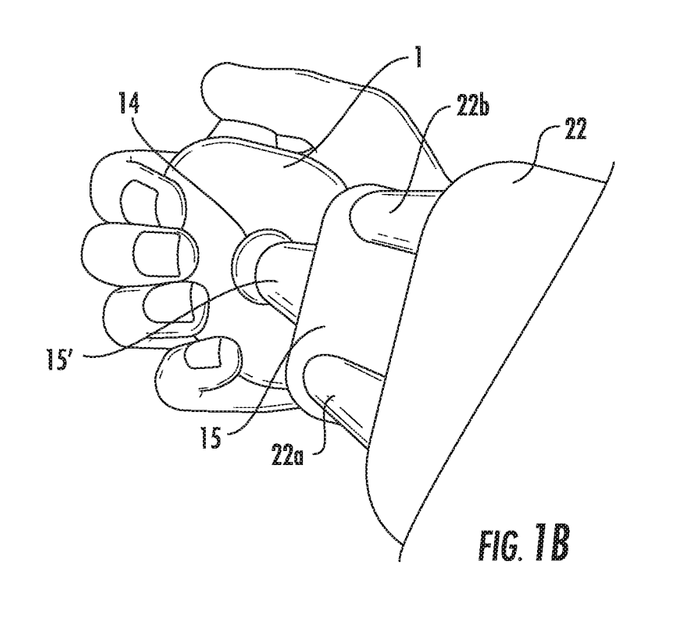
FIG. 1b shows a bottom view of the device according to one embodiment.
Figure 1C:
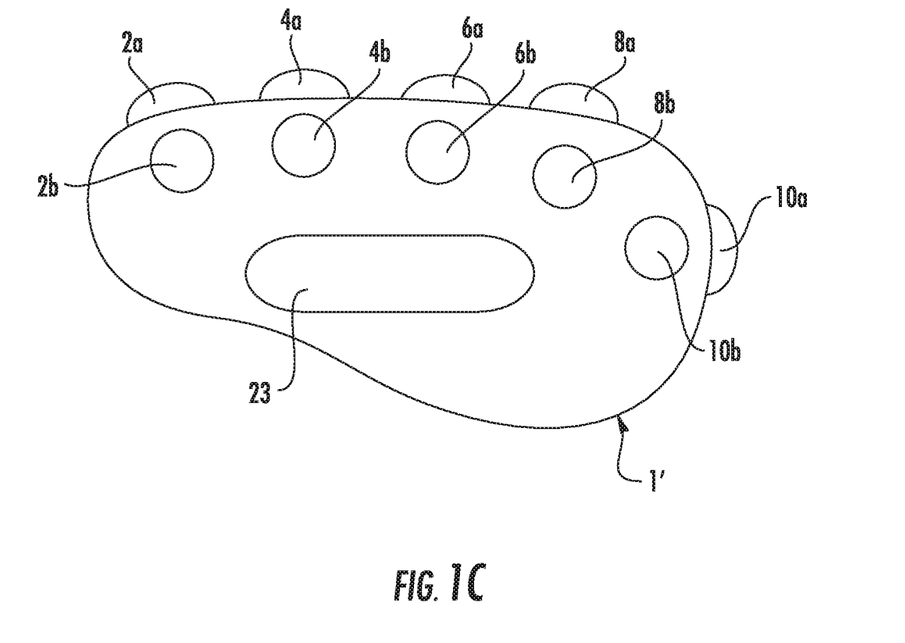
FIG. 1c shows an alternative embodiment of a housing of the device.
Figure 2:
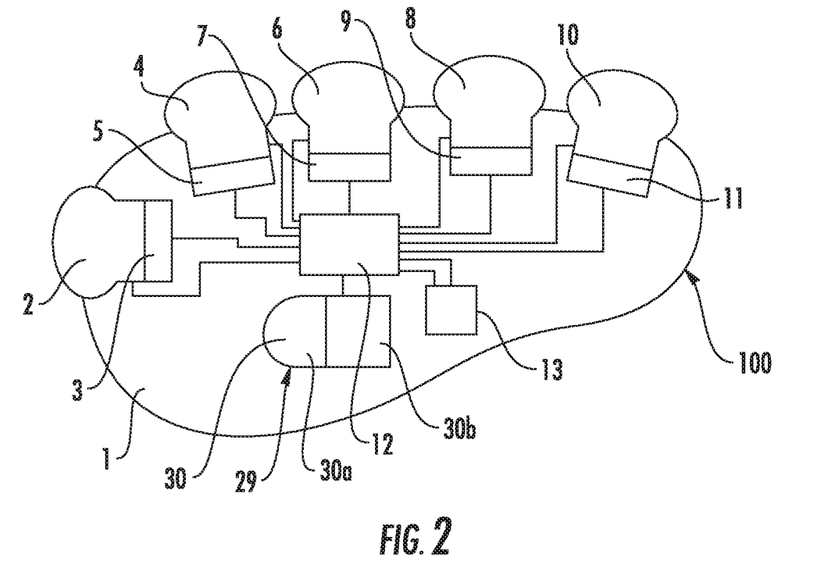
FIG. 2 shows an internal view of components within the device of FIGS. 1a-1d.

As shown in FIG. 2, a first embodiment of the device 100 includes a housing 1 which is configured to fit comfortably in the palm of the user's hand 200. The housing 1 preferably has a generally ellipsoid shape, which corresponds to a user's palm and closed first. Preferably, the housing 1 has an ergonomic shape providing for fit and comfort. The housing may comprise or be otherwise covered by a flexible or elastic material, such as a rubberized material, or NEOPRENE, for comfort. The housing 1 preferably includes a plurality of buttons 2, 4, 6, 8, 10. In one embodiment, the housing 1 includes five buttons 2, 4, 6, 8, 10 which are positioned on the housing 1 such that when the user grasps the housing 1 with their palm positioned comfortably, the buttons 2, 4, 6, 8, 10 rest, in one embodiment, under the tips of the fingers of the user's hand. As shown in FIG. 1c, in a multiple buttons embodiment, a button may rest under each section or portion of a user's finger. As shown in FIG. 1c, the housing 1' includes a plurality of finger buttons 2a, 2b, 4a, 4b, 6a, 6b, 8a, 8b, 10a, 10b, as well as a button for the palm 23.

Those of skill in the art will recognize from this disclosure that a different number and configuration of buttons could be used within the scope of the invention. For example, in one embodiment, the housing 1 can include, by way of illustration, fifteen buttons, with a five sets of three buttons, each of the five sets configured for engagement with a respective finger. In another embodiment, a track-ball or scroll-wheel can be provided on the housing 1 for manipulation by a user's hand. Each of the plurality of buttons 2, 4, 6, 8, 10 is associated with a corresponding one of a plurality of vibration elements 3, 5, 7, 9, 11. In one embodiment, each of the plurality of buttons 2, 4, 6, 8, 10 is arranged directly in physical engagement with a respective one of the plurality of vibration elements 3, 5, 7, 9, 11.

The plurality of vibration elements 3, 5, 7, 9, 11 causes its associated button 2, 4, 6, 8, 10 to vibrate, which imparts tactile feedback to the finger associated with said button 2, 4, 6, 8, 10. In one embodiment, the housing 1 furthermore comprises an orientation sensor 30 preferably a gyroscope 30a in communication with or otherwise comprising a sensor 29, for detecting and measuring the orientation of the housing 1. In one embodiment, the orientation sensor 30 includes a gyroscope 30a and an accelerometer 30b. In another embodiment, the orientation sensor 30 can also include a heartrate sensor. The gyroscope 30*a* is configured to detect a plurality of types of motion, including but not limited to displacement, velocity, acceleration, tilting, rotation, and inversion. The plurality of buttons 2, 4, 6, 8, 10, plurality of vibration elements 3, 5, 7, 9, 11, and the gyroscope 30*a* are preferably associated with a processor 12. The plurality of buttons 2, 4, 6, 8, 10, the plurality of vibration elements 3, 5, 7, 9, 11, and the gyroscope 30*a* each provide input signals to the processor 12, and the processor 12 sends output signals to each of the plurality of buttons 2, 4, 6, 8, 10, the plurality of vibration elements 3, 5, 7, 9, 11, and the gyroscope 30*a*.

The processor 12 is preferably in electrical communication with the plurality of buttons 2, 4, 6, 8, 10, plurality of vibration elements 3, 5, 7, 9, 11, and gyroscope 30*a* such that data can be transmitted and received to and from the processor 12 from the components in the housing 1. The processor 12 accepts data from the plurality of buttons 2, 4, 6, 8, 10 for processing and transmission to a transmitter/receiver unit 13. The transmitter/receiver unit 13 transmits data to a central processing unit (CPU) or computer 40 for use in visualization software such as immersive 3-D virtual reality software. For example, if the user presses a combination of the buttons 2, 4, 6, 8, 10, then the processor 12 transmits data corresponding to that respective combination of pressure for the buttons 2, 4, 6, 8, 10 to the transmitter/receiver unit 13, which then transmits the data to the computer 40. The visualization software associated with the computer 40 then also generates tactile feedback data, which can be transmitted by the computer 40 to the transmitter/receiver unit 13. The transmitter/receiver unit 13 sends this data to the processor 12 which causes vibration elements 3, 5, 7, 9 11 to vibrate. The transmitter/receiver unit 13 serves as an uplink/downlink or transmitter/receiver between the processor 12 and the computer 40.

Figure 3:
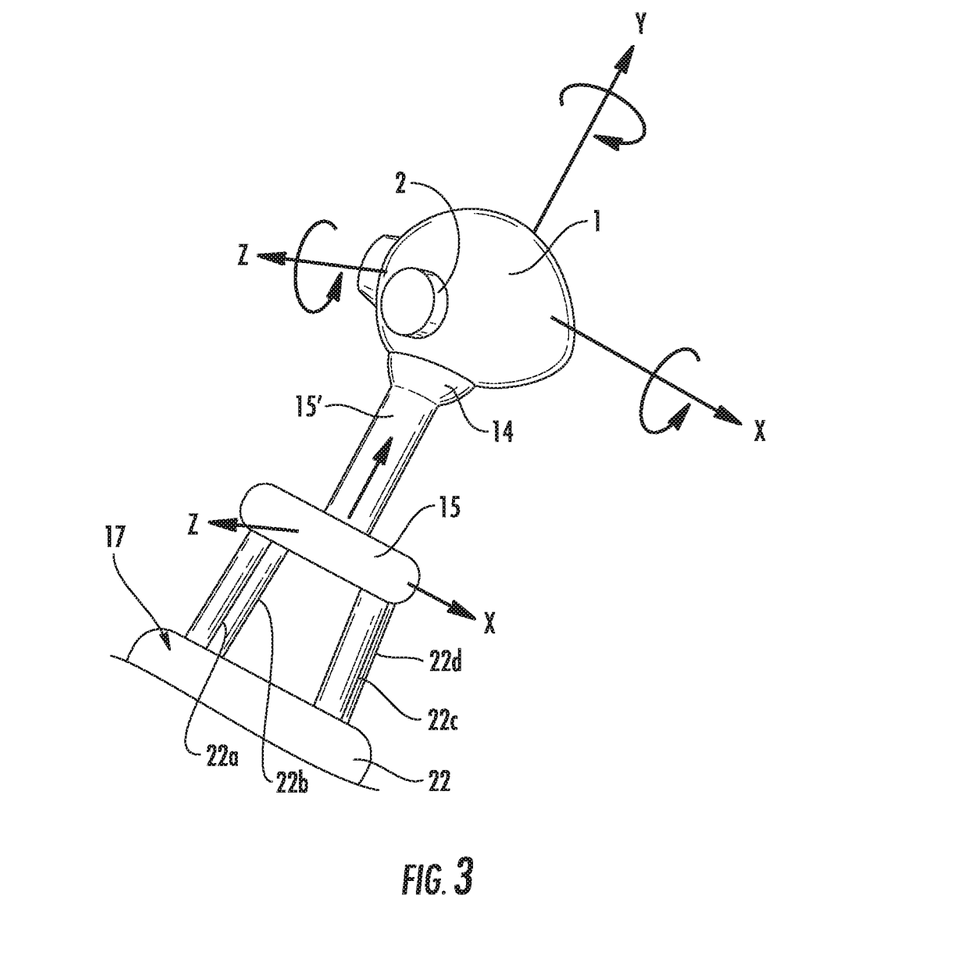
FIG. 3 shows a perspective view of the device including degrees of movement axes.

As shown in FIG. 3, a bearing 14 allows a user to freely rotate the housing 1 through a range of motion when the user grips and operates the housing 1. The bearing 14 could include any suitable joint-type arrangement, such as a ball and socket bearing, to allow the housing 1 to move in multiple dimensions and through a range of motion. For example, the bearing 14 allows the housing 1 rotate, move forward, backward, left, right, tilt, and any combination thereof. As the user rotates the housing 1, then the gyroscope 30*a* generates data related to the three dimensional orientation of the housing 1 so that data can be used in visualization software in the computer 40 to rotate an associated virtual hand in a virtual world. For example, a user can bend and twist the user's wrist while grasping the housing 1 and intuitively cause similar movements of a virtual hand in a virtual world. The housing 1 preferably attaches to a grip 15 of a 3-D mouse 17 and a feedback controller 22 so that as the user moves the housing 1, then the grip 15 of the 3-D mouse 17 moves accordingly and the transmitter/receiver unit 13 sends data to visualization software. The grip 15 is designed to comfortably fit in the user's hand and can include buttons 15*a*, 15*b*, 15*c* that are actuated to provide further feedback to the user. In one embodiment, the grip 15 includes analogue buttons. In one embodiment, the buttons are placed so that each of the user's fingers rests comfortable on a corresponding button. The feedback controller 22 holds and moves the grip 15 in accordance with physical sensations that the user would feel and which are commensurate with the actions and experiences of the user's representation in the virtual world. The grip 15 and feedback controller 22 each provide an additional point of movement and/or pivoting for the housing 1, such that the grip 15 and feedback controller 22 act as joints for the device 100, i.e. each of the components provide additional degrees of freedom for the device.

Figure 1D:
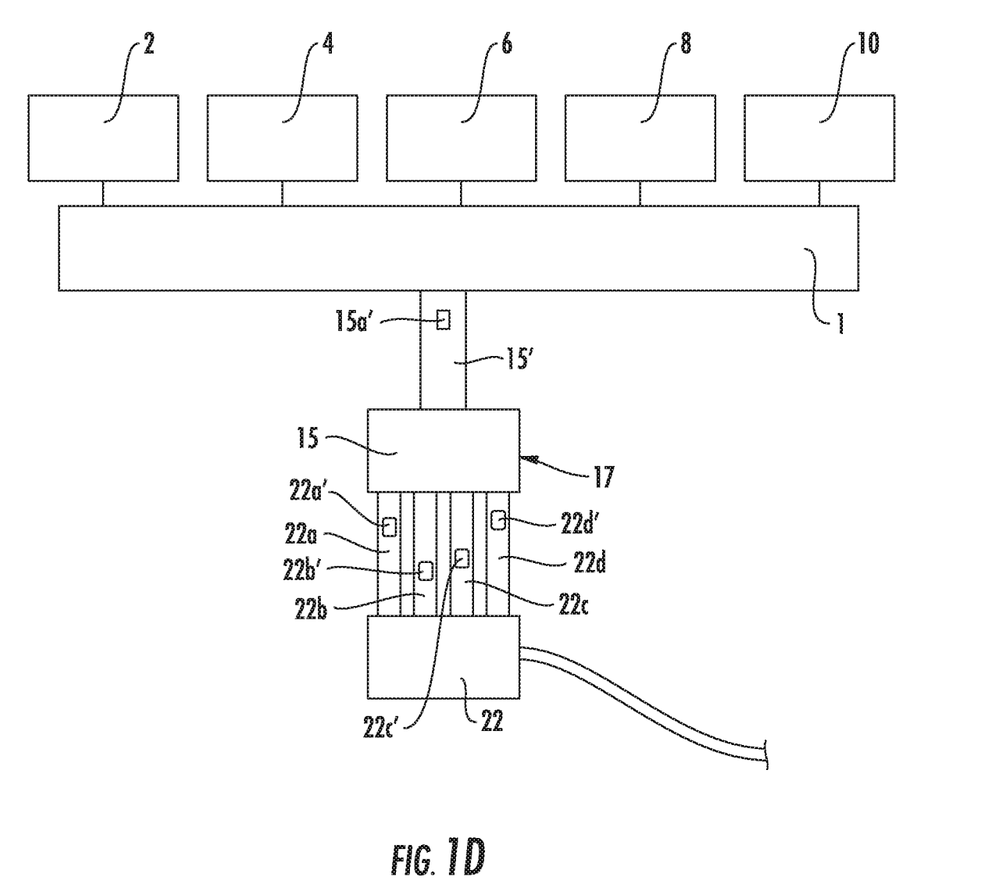
FIG. 1d shows a schematic diagram of an embodiment of the housing of the device.

FIG. 1*d* shows a schematic diagram of the housing 1, the 3-D mouse 17, the grip 15, and the feedback control 22. As shown in FIG. 1*d*, the grip 15 is connected to the housing 1 via a grip shaft 15'. In one embodiment, the grip shaft 15' is flexible. In one embodiment, the grip shaft 15' is connected at a first end by a resilient ball-socket joint to the housing 1 and at a second end by a resilient ball-socket joint to the grip 15. Based on this connection to the housing 1 and grip 15, the grip shaft 15' provides enough support to keep the housing 1 erect in a resting position, but provides additional degrees of motion for the device 100 when a user manipulates the housing 1. In one embodiment, the grip shaft 15' includes a grip sensor 15*a'* that detects deformations and movement of the grip shaft 15'. The grip sensor 15*a'* collects data related to deformation and movement of the grip shaft 15' and this data is used by the computer 40 to correspond the physical movement of the housing 1 with the virtual reality element. The grip sensor 15*a'* includes a plurality of sensors, including an accelerometer, gyroscopic sensor, torque sensor, strain gauge or any combination of known sensors. Similarly, feedback controller shafts 22*a*, 22*b*, 22*c*, 22*d* are provided between the grip 15 and the feedback controller 22. Although four feedback controller shafts 22*a*, 22*b*, 22*c*, 22*d* are shown in FIG. 1*d*, one of ordinary skill in the art will recognize from the present disclosure that any number of shafts could be used. Similar to the grip shaft 15', each of the feedback controller shafts 22*a*, 22*b*, 22*c*, 22*d* are preferably connected at each end to a respective component via a resilient ball-socket joint. This arrangement provides additional degrees of freedom for movement of the housing 1. The feedback controller shafts 22*a*, 22*b*, 22*c*, 22*d* each include feedback controller shaft sensors 22*a'*, 22*b'*, 22*c'*, 22*d'*, respectively. These feedback controller shaft sensors 22*a'*, 22*b'*, 22*c'*, 22*d'* each includes a plurality of types of sensors, including but not limited to an accelerometer, a gyroscopic sensor, a torque sensor, and a strain gauge. One of ordinary skill in the art recognizes that other types of sensors could be integrated into the feedback controller shafts 22*a*, 22*b*, 22*c*, 22*d* to detect additional data points regarding the feedback controller shafts 22*a*, 22*b*, 22*c*, 22*d*. The data detected by the grip sensor 15*a'* and the feedback controller shaft sensors 22*a'*, 22*b'*, 22*c'*, 22*d'* is sent to the computer 40 for plotting and mapping the detected motions with respect to a virtual reality element. The data from the grip sensor 15*a'* and the feedback controller shaft sensors 22*a'*, 22*b'*, 22*c'*, 22*d'* can be processed by the device processor 12, and sent to the computer 40 via the transmitted/receiver unit 13.

In one embodiment, the visualization software includes immersive 3-D virtual reality software. In addition, if the grip 15 of the feedback controller 22 receives forces related to feedback generated by visualization software then those forces are imparted to the housing 1 of the device and thereby felt by the hand of the user.

Figure 4:
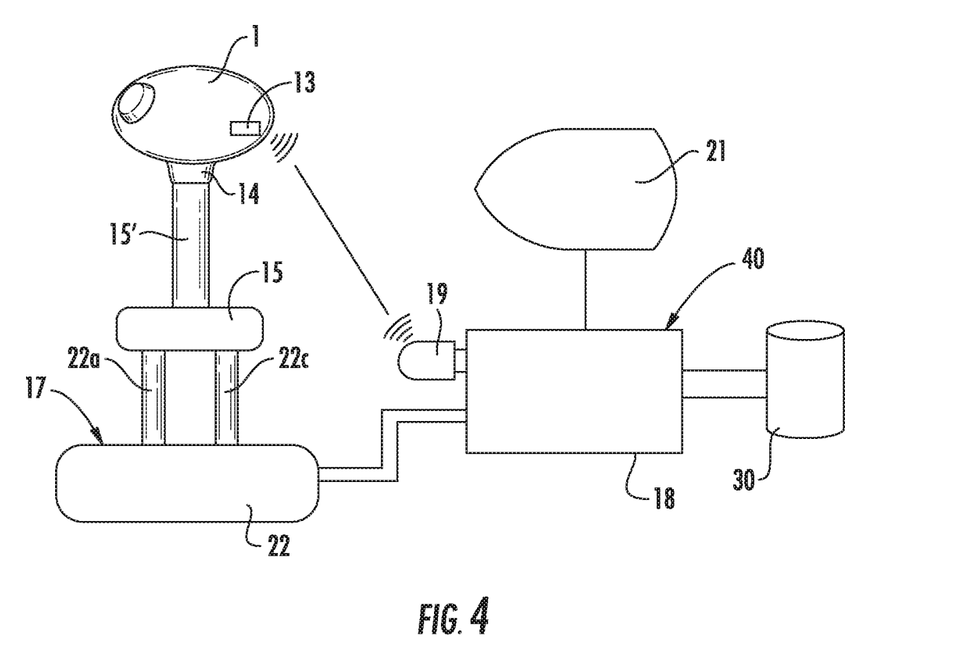
FIG. 4 shows a diagram of the device of FIGS. 1a, 1b, and 2 with a computer system according to one embodiment.

FIG. 4 one embodiment of the device as used as intended with the computer 40, the 3-D mouse 17, and the feedback controller 22. The transmitter/receiver unit 13 transmits data generated by the processor 12. The transmitter/receiver unit 13 is preferably wireless, but a wired or other communication could be used to transmit data and signals between the components. A central processor 18 accepts data from the device processor 12 which is used to compute refined data related to the articulation and orientation of the virtual hand, and the refined data is stored or used in software such as immersive 3-D virtual reality software. The central processor 18 receives data from the device's transmitter/receiver unit 13 though a second transmitter/receiver unit 19 in the central processor 18. The central processor 18 connects to a storage device 20 and a display device 21, which provides visual feedback to the user. The storage device 20 includes a memory unit, and the memory unit stores multiple virtual reality scenarios, which can be loaded by the computer 40. The computer 40 is preferably connected to the internet. The computer 40 can download or stream multiple virtual reality scenarios, which are displayed on the display device 21. The user manipulates the housing 1 to interact with a selected one of the virtual reality scenarios. As used in this application, a virtual reality scenario can include, for example, an artificially created landscape that the user's point of view moves through as if the user is present in that particular landscape. In one embodiment, the user approach a virtual reality tree in a virtual reality landscape, and manipulate the tree via movement of the housing. In our system the user would receive physical feedback through the device that indicate when the user's artificially created hand contacts the artificial tree and that reflect the texture of the tree's surface.

Figure 5:
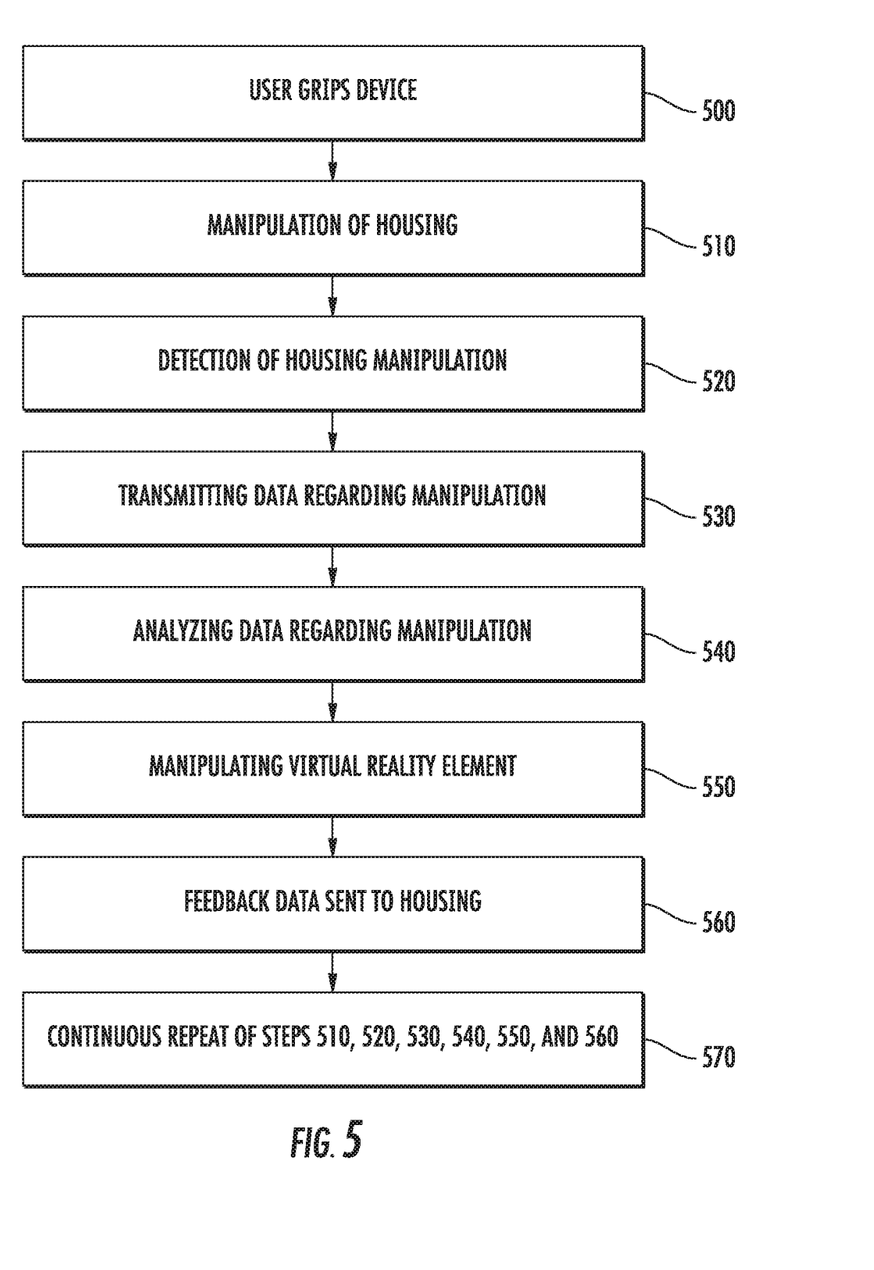
FIG. 5 shows a flow chart illustrating the steps for interaction between the device and the computer according to one embodiment.

FIG. 5 illustrates the steps for interaction between the housing 1 and the computer 40. As shown in FIG. 5, step 500 includes a user gripping the housing 1. Next, step 510 includes the user manipulating the housing 1, which includes multiple degrees of motion, as well as displacement of the housing 1. Step 520 includes detecting the manipulation of the housing 1, and converting data regarding the manipulation via the processor 12. Step 530 includes the first transmitter/receiver unit 13 of the housing 1 transmitting data to the second transmitter/receiver unit 19 of the computer 40. Step 540 includes the central processor 18 of the computer 40 analyzing the data transmitted from the housing 1 to manipulate a virtual reality element such that the manipulation of the virtual reality element corresponds with the manipulation of the housing 1. Step 550 includes the display device 21 simultaneously displaying a virtual reality element in a virtual reality scenario as being manipulated in real-time based on the movement detected during step 510. Step 560 includes feedback data being sent by the second transmitter/receiver unit 19 to the first transmitter/receiver unit 13, and the housing 1 being moved and manipulated based on the feedback data. Step 570 includes the repetition of steps 510, 520, 530, 540, 550, and 560, in any order or combination of steps. One of ordinary skill in the art recognizes that other steps may be included to provide for interaction between the housing 1 and the computer 40. The steps are provided in a continuous feedback loop, such that the user continues manipulating the housing 1 and the computer 40 continuously provides visual feedback via the display device 21 and physical feedback via impulses sent to the housing 1 based on the user's manipulation of the housing 1 and interaction of the virtual reality element in the virtual reality scenario.

Other embodiments will be obvious to one skilled in the art. For example, the buttons may be actuated as well as or instead of vibrating. Also, buttons may be replaced by touch sensors. Also, for example, direction changes can be detected by an accelerometer rather than a gyroscope. I intend to include all such embodiments that are obvious to one with ordinary skill in the art.

What is claimed is:

1. A system for dexterous interaction in a virtual world, the system comprising:
a manipulation device comprising:
a housing including a plurality of buttons and a plurality of vibration elements each associated with at least one of the plurality of buttons;
an orientation sensor configured for detecting data based on orientation of the housing;
a processor in communication with the plurality of buttons, the plurality of vibration elements, and the orientation sensor, wherein the processor is configured to receive the data from the orientation sensor, and the processor is configured to transmit the data;
a computer comprising a display, wherein a virtual environment including at least one virtual element adapted to be manipulated based on movement of the manipulation device is shown on the display, and
the computer receives the data from the processor and the computer is configured to analyze the data to manipulate the at least one virtual element, and manipulation of a secondary virtual element by the at least one virtual element in the virtual environment provides tactile feedback to the manipulation device, and the tactile feedback is representative of at least a surface characteristic of the secondary virtual element.

2. The system of claim 1, wherein the housing is configured to move with three degrees of freedom via a bearing.

3. The system of claim 1, wherein the housing is coupled with a 3-D mouse and feedback controller via a bearing.

4. The system of claim 1, wherein the orientation sensor comprises an accelerometer and a gyroscope.

5. The system of claim 1, wherein the computer includes a storage device that includes a memory unit, the memory unit includes a plurality of virtual environments, the plurality of virtual environments are displayed on the display, and a user interaction occurs with each one of the plurality of virtual reality scenarios based on movement of the manipulation device.

6. The system of claim 1, wherein the processor is configured to wirelessly transmit and receive the data, and the computer is configured to wirelessly transmit and receive the data.

7. The system of claim 1, wherein the plurality of buttons are aligned with a user's fingers, and engagement of the plurality of buttons by the user results in a corresponding proportional manipulation of virtual reality fingers in the virtual scenario displayed on the display.

8. The system of claim 1, wherein the housing has an ellipsoid shape.

9. The system of claim 1, wherein the housing is connected to a flexible shaft.

10. The system of claim 1, wherein the housing is connected to a plurality of controller shafts each associated with a feedback controller shaft sensor.

11. The system of claim 1, wherein the plurality of vibration elements each provide sensory output associated with a virtual hand in visualization software.

12. The system of claim 1, wherein the virtual element is manipulated in real-time and in a continuous feedback loop based on the data transmitted and received between the manipulation device and the computer.

13. The system of claim 12, wherein the continuous feedback loop provides physical feedback to the manipulation device based on manipulation of the virtual element.

14. The system of claim 1, wherein the at least one virtual element is manipulated in real-time based on the data corresponding to manipulation of the manipulation device.

* * * * *